Patented Jan. 23, 1940

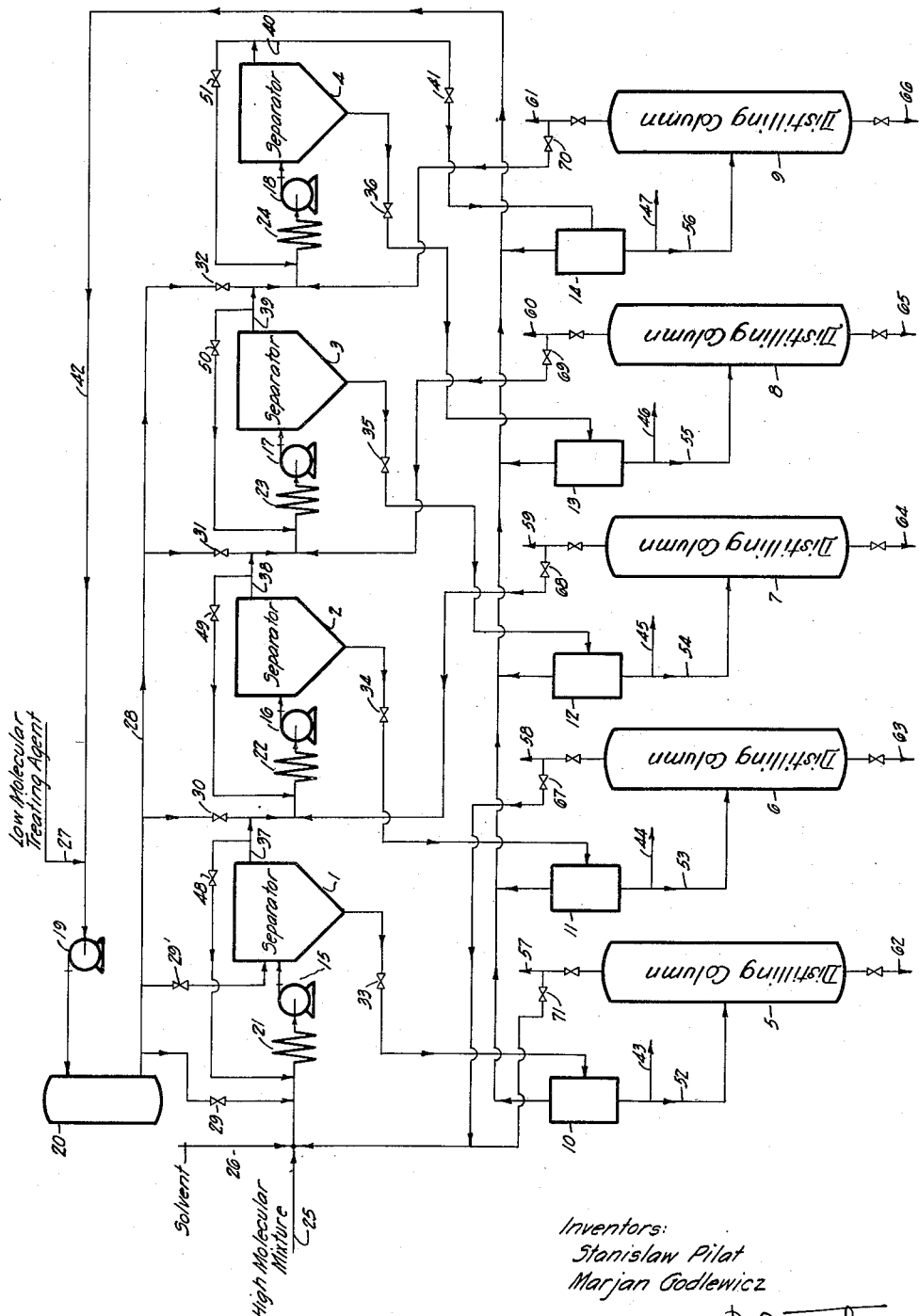

2,188,012

UNITED STATES PATENT OFFICE 2,188,012

METHOD OF SEPARATING HIGH MOLECULAR MIXTURES

Stanislaw Pilat and Marian Godlewicz, Lwow, Poland, assignors to Shell Development Company, San Francisco, Calif., a corporation of Delaware Application February 4, 1936, Serial No. 62,294
In Poland February 6, 1933

17 Claims. (Cl. 196—13)

This invention pertains to a method of separating mixtures of high molecular substances into two or more fractions having different chemical and/or physical properties, and is a continuation-in-part of our application Serial No. 708,988, filed January 30, 1934. Certain patentable subject-matter disclosed but not claimed in the present specification and claims is claimed in the above application, and in our application Serial No. 76,466, filed April 25, 1936.

Industrial materials which contain complex mixtures of organic or inorganic compounds may be separated into desirable fractions containing concentrates of one or more pure substances, or of one or more groups of substances which have similar physical properties and/or chemical compositions by many known methods, such as distillation, crystallization, treatment with selective solvents, adsorption, etc.

The known processes for effecting these separations have many limitations. For example, distillation methods often result in a decomposition of the materials being treated, and are, moreover, ineffective to separate substances having the same or almost the same vapor pressures; the degree of separation effected by crystallization methods and selective solvent extraction methods is such, that the products must often be further treated to obtain products of the desired purity; and considerable losses are often involved in the use of adsorption methods.

According to the present invention we provide a new and convenient method of separating high molecular mixtures into portions of different properties by means of a low molecular substance, herein designated as a gaseous treating agent. Our invention further contemplates the separation of such high molecular mixtures into two or more fractions with the aid of a low molecular treating agent, followed by a distillation treatment. Other objects of our invention will be apparent from a reading of the following specification.

Our invention may, for example, be applied to the separation of liquid or meltable high molecular mixtures, or high molecular mixtures which may be brought into solution by the use of suitable solvents, such as crude mineral oils, their distillates or residues, mineral oil fractions obtained by extraction of petroleum oils, shale oils, and other hydrocarbon and non-hydrocarbon mixtures, like coal tar, coal tar oils, wood tar, animal and vegetable oils, such as bone fat oil, mixtures of fatty acids, esters, phenols, alcohols, organic nitrogen-containing substances, chlor-derivatives, pharmaceutical preparations, preparations obtained from living organisms, such as, for example, hormones, and many other chemicals. The process may be applied to separate mixtures of different chemical classes of substances, or to free materials from impurities, or to separate members of homologous or analogous chemical groups. While we have in our parent application described the treatment of hydrocarbon mixtures with certain low molecular treating agents, we have now discovered that the method of treatment described therein may also be applied to mixtures containing non-hydrocarbon compounds, such as for example, those enumerated above.

Our process is based upon our discovery that high molecular mixtures can be separated into portions containing substances of different molecular weights and/or chemical structure, by treating the mixture, while in the liquid state, under superatmospheric pressure with a low molecular substance under conditions which cause a lowering in the density of the mixture, thereby causing the mixture to "demix", i. e., to separate into two or more phases of different densities, of which the lighter phase is liquid and contains the greater part of the low molecular substance, and the heavier phase may be liquid, semi-solid, or solid. As applied to the phases produced as a result of this demixing, the term "liquid" is used to designate a phase having a density greater than the critical density of the low molecular substance. The expression "liquid state" as applied to the high molecular mixture being separated is intended to include the pure mixture, as well as a solution of such a mixture in a suitable liquid solvent. The light and heavy phases produced in this manner may be separated by settling and decantation, or by centrifuging, or in some other manner, without changing their compositions, and then separately treated to remove the gas and solvents from the high molecular substance.

The temperature of the treatment is preferably, but not necessarily, in the vicinity of the critical temperature of the low molecular treating agent, or somewhat above this temperature. Temperatures in the vicinity of the critical temperature, or above this temperature, are in the present specification referred to as "para-critical" temperatures. The lowest temperature at which a low molecular substance may be regarded as being in the para-critical state, i. e., the lower limit of the useful operating temperature range, will depend upon the nature of the low molecular substance, but generally lies between the critical temperature and the temperature of maximum solubility, i. e., the temperature above which a rise in the temperature of the low molecular substance in the liquid state under its own vapor pressure is accompanied by a decrease in its solvent power for the high molecular material. In general, substances are said to be in the paracritical state when their temperature is not more than about 30° C. to 60° C. below the critical temperature, or is above the critical temperature, although these specific limits are not rigid, and may in certain cases be exceeded. Thus, even lower temperatures may sometimes be employed, provided that the pressures are low enough to prevent the liquefaction of the low molecular treating agent, it being in this case, of course, requisite that the low molecular substance be sufficiently soluble in the high molecular mixture to be dissolved therein at the stated pressure in sufficient quantity to cause the desired precipitation of the components of higher internal pressures. This solubility may often be increased by the use of suitable solvents.

It will be noted, therefore, that the low molecular treating agent may be employed either in the vaporous or truly gaseous state. In the present specification and claims, the expression "gaseous" is intended to be generic to both of these states.

Summarizing, the treatment with the low molecular gaseous treating agent, which process is hereinafter for convenience referred to as "gas fractionation", consists in separating a high molecular mixture by treating it with a low molecular treating agent either under such conditions of temperature and pressure as determine the gaseous state of the agent, or under para-critical conditions, i. e., under conditions under which the agent may be liquefied but its solvent power for the high molecular mixture decreases with a rise in temperature.

The fractionation effected by operating under these conditions causes many high molecular substances to be separated which cannot be separated, or which cannot be separated as completely, by employing a liquid, low molecular substance at a lower temperature, or a gaseous treating agent at normal pressure. For example, it is known to precipitate asphalts or solid paraffin wax from hydrocarbon oils by dissolving the oil in propane. This may be effected at temperatures lower than 60° C.; but unless the temperature is substantially above this point, propane will not normally and by itself cause a separation between paraffinic and aromatic (or naphthenic) hydrocarbons, while the latter separation may be effected by employing propane under the conditions of our process, the non-paraffinic hydrocarbons being precipitated in the denser phase, substantially free from propane, and the paraffinic hydrocarbons being in the lighter liquid phase.

The gas fractionation described herein should, moreover, be distinguished from conventional liquid phase extraction processes, in which a selective solvent, like liquid $SO_2$, is contacted with a hydrocarbon oil to dissolve the components of high internal pressure, as, for example, aromatic or naphthenic hydrocarbons, which are precipitated in our process. Certain of these processes employ the solvent, such as $SO_2$, in the gaseous state; in these cases, however, the solvents have heretofore been employed at temperatures far below their critical temperatures, and, upon being mixed with the oil, behave in a manner similar to the liquid selective solvents, in that they preferentially dissolve the hydrocarbons which are relatively more polarizable and/or which have high internal pressures, i. e., the aromatic and/or naphthenic hydrocarbons. Thus, in the known processes, increasing the quantity of the gaseous selective solvent has the effect of dissolving additional quantities of these more polarizable substances of high internal pressure in the solvent phase; while in our process, the introduction of larger quantities of the gaseous treating agent causes larger amounts of these same substances to be precipitated from the solvent phase.

Any low molecular substance which is capable of being dissolved in the high molecular mixture being fractionated, or in its solution in a suitable solvent, to cause the lowering of its density and/or its internal pressure to the extent of causing the formation of two liquid phases may be employed. Since our process is preferably carried out at temperatures in the proximity and above the critical temperatures of the gaseous treating agents, it is necessary to select a substance having a low enough critical temperature so that the temperature of operation is not inconveniently high, will not cause the decomposition of the high molecular substances, and will not be so high as to prevent the formation of two phases, since a rise in temperature generally is accompanied with a corresponding increase in the miscibility of the components of the high molecular mixture. The maximum operative temperature will depend upon the nature of the high molecular mixture as well as upon the properties of the gaseous treating agent. In view of these requirements, we prefer, when treating hydrocarbon oils, to employ low molecular substances having critical temperatures below about 200° C. The preferred group of low molecular substance, therefore, consists of aliphatic hydrocarbons having between one and five carbon atoms in the molecule, such as methane, ethane, ethylene, propane, propylene, acetylene, normal- or iso-butane, etc., although aliphatic substances having as many as eight carbon atoms may in certain cases be employed. Among other gases which may be employed as low molecular treating agents, the following may be mentioned, without, however, restricting the scope of the invention thereto: hydrogen, carbon monoxide, water gas, dry natural gas, natural gas, sulfur dioxide, sulfur trioxide, ammonia, ethyl chloride, dichlor-difluor methane, methylene fluoride, dimethyl ether, methyl ethyl ether, dimethyl amine, hydrogen chloride, and rare gases, such as helium. The gaseous treating agent should, preferably, be incapable of reacting chemically with the high molecular substances under the conditions of the treatment, no chemical change being contemplated in the gas fractionation.

As stated above, the hydrocarbons or other non-hydrocarbon high molecular mixture may be gas-fractionated after being dissolved in a suitable solvent, which preferably increases the solubility of the gaseous treating agent in the mixture. These solvents may, for example, be low boiling or liquefied aliphatic hydrocarbons of the type commonly known as deasphalting agents, such as propane, propylene, normal- and iso-butane, butylene, pentanes, pentenes, hexanes, hexenes, and their mixtures, as well as light, straight run naphthas, and other light, preferably aromatic-free fractions of mineral oil, boiling preferably below about 270° C., although even higher boiling distillates may be desirable when treating certain high molecular mixtures.

The solvent may often be employed to effect a preliminary refining. For example, when fractionating a hydrocarbon mixture, and this mixture contains, as most distillation residues do, certain asphaltic or resinous materials, it is preferable in many cases to precipitate these materials by dissolving the oil in a deasphalting agent, separate the precipitate from the oil in solution, and then treat the oil, together with all or a portion of the deasphalting agent with the gaseous treating agent.

Alternatively, or in conjunction with the above hydrocarbon solvents, a solvent from the group of solvents known as selective naphthenic (or aromatic) solvents may be employed. This group comprises, inter alia, liquid sulfur dioxide, (at temperatures below para-critical, i. e., below about 100° C.) BB' dichloroethyl ether (Chlorex), cresylic acid, phenol, aniline, pinoline, as well as alcohols, or ethers, their mixtures, and their solutions in diluents, such as benzol. These polar solvents often are effective to increase the sharpness of the separation. In the preferred form of our invention, such selective solvents are added to the initial high molecular mixture in such quantity as substantially to saturate it without causing it to separate into two phases at the temperature used in our treatment prior to the introduction of the gaseous treating agent.

The solvent employed should preferably have a higher critical temperature than the gaseous treating agent, so as to be in the liquid state under the conditions of the treatment, although it may be added to the mixture either in the vaporous or liquid state. Thus, when propane is used as the gaseous treating agent, butane or a higher boiling solvent should be employed; and when $SO_2$ is used as a solvent, methane, ethane, ethylene or carbon dioxide is preferably used as a gaseous treating agent, although propane may in certain cases be employed.

Auxiliary treating agents, such as fuller's earth, silica gel, naphthalene, phenanthrene, dinitrobenzene, and the like, may be added to the high molecular mixture, either together with the above solvent, or alone, these agents being particularly desirable when treating dark-colored mixtures, such as residual mineral oils.

The purpose of dissolving the high molecular mixture in the solvent, or of adding adsorbing agents, is to modify the fractionating effect obtained with the gaseous treating agent, and to improve the sharpness of the separation, because we found that the compositions of the fractions obtained by our method of treatment after first dissolving the mixture in a solvent are often more desirable than those obtained from the treatment of undissolved mixtures. A further purpose is to increase the flexibility of the process by increasing the solubility of the gaseous treating agent, thereby extending the temperature and pressure ranges under which the gaseous treating agent is capable of effecting the desired demixing.

Under the conditions of our process, the gaseous treating agent has a low internal pressure, and is effective to lower the density and the internal pressure of the high molecular mixture; as a result those components of the high molecular mixture which have the greatest internal pressures and/or the highest molecular weights are selectively thrown out of the solution containing the other components of the high molecular mixture and the gaseous treating agent. The separation effected may, therefore, be either on the basis of molecular size or chemical structure. In certain cases, as when treating hydrocarbon oils which contain large numbers of substances different in chemical structure, and in which each group of chemically related substances contains various substances of different molecular sizes, both the chemical structure and the molecular size will influence the composition of the fractions obtained. When treating mixtures of this type, the fractions obtained are such that a subsequent distillation treatment may advantageously be employed to cause a further separation, as described more fully below.

The quantity of the low molecular, gaseous treating agent dissolved in the mixture being fractionated determines the quantity of the high molecular substances which are precipitated in the heavier phase; and the quantity of gaseous treating agent dissolved can, in turn, be conveniently controlled by regulating the pressure. It follows that by a suitable choice of operating pressures the size of the lower phase can be varied at will within relatively wide limits.

This circumstance makes it possible to operate our process to separate multi-component mixtures into more than two fractions, by increasing the pressure step-wise, and removing the separated heavy phase after each increase in pressure. For example, after producing primary light phases by forcing a low molecular gas into a mixture at a certain pressure, and separating the phases, the separated lighter liquid phase may be contacted with the same gaseous treating agent at a higher pressure, or with a different gaseous treating agent under a pressure which will cause additional quantities of the gaseous treating agent to be dissolved in the said lighter phase, so as to cause a further decrease in its density and/or its internal pressure. This causes the high molecular substances contained in the primary light phase to demix, and form two secondary liquid phases of different compositions and specific gravities. As in the first treatment, most of the gaseous treating agent will be retained in the secondary lighter liquid phase. By repeating this treatment with successive light liquid phases in a series of steps by using progressively increasing pressures and/or progressively more soluble gaseous treating agents, so as to introduce additional quantities of a gaseous treating agent into the solution at each stage, the high molecular mixture may be fractionated into any desired number of fractions of different properties and compositions. However, instead of introducing additional quantities of a gaseous treating agent into one of the lighter liquid phases (either primary, secondary, or any subsequent one), to lower its density and/or its internal pressure, it is also possible to effect the further fractionation or demixing of one of the lighter liquid phases by suitably varying the pressure and/or the temperature. For example, the pressure may be maintained substantially constant, and the temperature may be changed to cause the desired formation of two liquid phases, or both the pressure and the temperature may be permitted to vary. Any of these methods may be used in a series of separations, or the two methods may alternate in a series of consecutive treatments.

It may be desirable in a series of consecutive treatments not only to vary the treating conditions, like pressure, temperature, and the quantity of the gaseous treating agent, but also to modify the quantity or composition of the solvent in which the high molecular mixture is dissolved, as, for example, by adding more of the solvent or adsorbent material already present in the solution, or by adding a new liquid diluent or a selective naphthenic solvent or adsorption material.

As was pointed out above, in mixtures containing many individual substances of different molecular weights and chemical structures, the above described gas-fractionation process produces fractions which are particularly adapted to be further treated by distillation methods, provided, of course, that the materials are sufficiently volatile. This procedure is particularly useful in the treatment of many hydrocarbon oils, where it is desired to produce a plurality of fractions of different viscosities and/or boiling temperature ranges, and at the same time separate the oil into relatively more paraffinic and relatively more aromatic or naphthenic portions. We have discovered, that when, for instance, a mixture of paraffinic and non-paraffinic hydrocarbons boiling within the same boiling range is gas-fractionated and the precipitated fractions are fractionally distilled, the resulting distillates are less paraffinic than the corresponding distillation residues. This phenomenon is opposite to what occurs when fractions of liquid phase extraction are distilled, in which case the overhead products are more paraffinic than the corresponding distillation residues. The simultaneous precipitation of low-boiling members of the more polarizable group (non-paraffinic) together with high boiling members of the less polarizable group (paraffins) is peculiarly characteristic of the gas fractionation. We have found the above effect to be particularly marked when a hydrocarbon is employed as the low molecular agent. This discovery is taken advantage of in our process by combining the gas fractionation with fractional distillation of separated fractions. When one or more of such fractions are obtained by our gas treatment, we subject at least some of them separately to the fractional distillation whereby each fraction is separated into a distillate (more polarizable or less paraffinic than the original fraction) and a distillation residue (less polarizable or more paraffinic than the original fraction).

For example, a heavier liquid phase produced by treating a lubricating oil fraction with a gas may consist predominantly of aromatic and naphthenic hydrocarbons which are undesirable as lubricants because of their low stability and viscosity index, and high oxidation value; this phase will, however, often also contain certain amounts of valuable highly viscous hydrocarbons which have low refractive indices. Similarly, certain subsequent fractions which consist mainly of desirable hydrocarbons may contain also certain quantities of low boiling, lower molecular hydrocarbons of low viscosity indices. Either of these types of fractions may be distilled to yield valuable lubricants as the bottom product, and the undesirable hydrocarbons in the top product. It should be noted that while we have particularly referred to lubricating oils, this feature of our invention is not limited thereto, but may be employed to separate hydrocarbon or non-hydrocarbon mixtures which contain substances differing both in chemical structure and molecular size into portions containing closely related substances.

If desired, the bottom products and/or the top products obtained by distilling several fractions produced by the gas fractionation may be blended to produce a composite product.

While we have, in the foregoing specification, expressed certain theories as to the cause of the separation of the high molecular mixtures, in terms of internal pressures, densities, etc., we do not wish to be limited to any theory expressed herein, but wish to include in the scope of our claims the operative steps disclosed and described.

The invention may be further understood from the following examples, which are not, however, included with a view of restricting the scope of our invention.

EXAMPLE I

Our process may, for example, be operated in the apparatus illustrated in the drawing, which is a diagrammatic flow sheet. The numbers 1 to 4 represent separating tanks; 5 to 9, distilling apparatus; 10 to 14, gas separators; 15 to 18, pumps; 19, a compressor; 20, a pressure reservoir for the gaseous treating agent; and 21 to 24, mixing devices, all interconnected with conduits, as shown and hereinafter described, and provided with suitable pressure gauges, temperature controlling devices, valves, and other auxiliary equipment, not shown. While we have shown four separating vessels and thereby illustrated an apparatus suitable for continuous operations, it should be noted that a single separating vessel will often suffice, as when only one stage is to be employed, or when a batch method of operation is used. Any number or stages may be provided.

In operation, a high molecular mixture, as, for example, a hydrocarbon lubricating oil, is introduced through a conduit 25, and pump 15, into the separating tank 1. If desired, a solvent for the hydrocarbon mixture, such as a deasphalting agent, or a naphthenic, selective solvent, may be introduced through a conduit 26 and mixed with the oil in the mixer 21. A gaseous treating agent is introduced at 27, compressed by the compressor 19, and introduced into the separating tanks 1 to 4 through the reservoir 20, conduit 28, and pressure reducing valves 29 to 32, which are adjusted to permit the desired flow of the gaseous treating agent into the mixers. The pumps 15 to 18 are operated to maintain in the separating tanks the pressures required to dissolve so much of the gaseous treating agent in the oil as is required to cause the desired phase separation, the pressures being progressively greater, with the greatest pressure in the tank 4. It should be noted that any other method of mixing the gas with the oil might be employed, such as introducing the gas directly into the separating vessel through a valve 29'.

The heavier phases from the separating tanks are continuously withdrawn through the valves 33 to 36, respectively, while the lighter liquid phases are continuously withdrawn through the upper outlets 37 to 40, all but the last of these being introduced into the next adjacent tank by means of the pumps 16, 17 and 18, after being mixed with the gaseous treating agent. The lighter phase from the tank 4 is passed through a valve 41 to the gas separator 14, in which the dissolved gaseous treating agent is separated from the liquid. The recovered gaseous treating agent may be returned to the tank 20 through a conduit 42. The heavier phases from the separating tanks are similarly introduced into gas separators 10 to 13, which may be operated like the apparatus 14. It should be noted, however, that the quantity of gaseous treating agent dissolved in these heavier phases is normally small in comparison to the quantity of the treating agent which is present in the lighter phase which is withdrawn at 40. If the solvent has been introduced at 26, the apparatus 10 to 14 may be operated as distilling apparatus to separate this solvent, or additional separating devices may be provided. The resulting fractions may be withdrawn from the system at outlets 43 to 47.

We found that the composition of the fractions is affected by the concentration of the lighter and/or the more paraffinic oil present in the separating tanks. This concentration can be varied, for example, by returning a portion of the lighter phase or phases to a mixer preceding the separating tank at which the light phase was produced, as by opening one or more of the valves 48, 49, 50 and 51. If desired the recycled material may be reintroduced more than one stage in advance of its point of withdrawal.

The above operation may be carried out either continuously, as described, or in a batch operation, only one separation tank being necessary in this case. In this latter mode of operation, the gaseous treating agent is preferably fed into the tank 1 through a pressure reducing valve 29', and the tank 1 is provided with a stirring apparatus. In each step of the process, the valve 29' is set to admit the gaseous treating agent, preferably in the gaseous state, at the desired pressure, the gaseous treating agent is mixed with the oil, and the resulting mixture allowed to stratify, normally into three phases, i. e., a gaseous phase, one light liquid phase, and a heavier phase, which may be either liquid or solid, although the presence of the gas phase is not essential. The heavy phase is withdrawn through the valve 33, and the valve 29' is adjusted to admit more gaseous treating agent at a higher pressure, which is again mixed with the oil. In this manner a series of heavy phases are obtained.

Moreover, although we have specifically described the separation of successive heavy liquid phases by adding more gas at a higher pressure, it should be noted that we may, instead, employ any other method for causing the further separation of the heavy phases in the several stages of the apparatus, as by varying the temperature and/or the pressure, and/or the quantity or composition of the solvent, as heretofore described.

The heavy phases withdrawn through the valves 33 to 36 may often contain an appreciable amount of the lighter and/or more paraffinic oil components which it may be desirable to recover in the lighter phase. This recovery may be effected by further gas treating the withdrawn heavy phase or phases in an auxiliary separating tank or tanks, the resulting lighter phase being returned to the settling tank, if desired. This further demixing of the heavy phase may be brought about by a treatment similar to that described above, but at lower pressures and/or lower temperatures.

The various fractions produced by gas fractionation, either in accordance with the above described method, or in accordance with any other gas fractionation methods, which vary the density and/or internal pressure of the mixture to produce fractions of a generally similar character, may be further fractionated by distillation. Thus one or more of these fractions are introduced into the distilling units 5 to 9 through conduits 52 to 56, the hydrocarbons of relatively higher refractive indices and/or lower viscosity indices and/or higher viscosity-gravity constants (i. e., the more aromatic or naphthenic hydrocarbons) being withdrawn as top products at 57 to 61, and the hydrocarbons which have relatively lower refractive indices, and/or higher viscosity indices, and/or lower viscosity-gravity indices being withdrawn at 62 to 66. Either all or some of these groups of products may be blended to form composite hydrocarbon products.

It should be noted that in the case of many viscous hydrocarbon oils, the heavy phase produced in the first separator, and withdrawn through the valve 33, is generally highly aromatic or asphaltic, and extremely viscous, and would not normally be distilled to produce a paraffinic oil. This phase may often be employed as a blending agent for asphalt, since we have found that it possesses excellent ductility-improving properties, and may be blended, for example, with blown asphalt, or other asphalt of low ductility.

The phases produced in the separators 1 to 4 are successively lighter and more paraffinic and the last light phase consisting mainly of hydrocarbons of one chemical type. For this reason the last light phase will often not be of a character which is suitable for further improvement by distillation; and the distilling operation in the column 9 will often be omitted. Moreover, in a long series of gas fractionating stages, the difference between the last few fractions will be primarily one of molecular size. In such a case the last few gas fractions would not be distilled.

The nature of the fractions produced by gas fractionation, and the operative details of this step of our process, may be more fully understood from the following two examples:

EXAMPLE II

A topped crude having a specific gravity of .9565 at 15° C. and an Engler viscosity of 3.03 at 100° C. was dissolved in 10 vols. of a liquid propane-butane fraction. After the separation of the precipitated asphaltic substances, a natural gas consisting substantially of methane and ethane was introduced under a pressure of about 150 atms. into deasphalted solution, which was maintained at room temperature. Under these conditions a heavy liquid layer containing 17.08% of the original topped crude sample separated out. The oil separated from the lighter liquid phase had a specific gravity of .9325, a good color, and a viscosity index of 37 (609 sec. Say. at 100° F., 58.6 sec. Say. at 210° F.). A duplicate run produced the corresponding oil having a viscosity index of 41. For comparison, a vacuum distillate from the same crude and having a specific gravity of .9377 has a viscosity index of 21 (532 sec. Say. at 100° F., 34.9 sec. Say. at 210° F.).

EXAMPLE III

For purposes of comparison with the previous example, a substantially asphalt-free and wax-free residual Potok oil having a specific gravity at 15° C. of .956, a viscosity of 165 sec. Say. at 210° F. was dissolved in 2.95 vol. (based on the volume of the asphalt-free oil) of a solvent containing 61% propane, 4% normal butane, 35% iso-butane, and treated with dry natural gas containing 99% methane, at room temperature, and at the various pressures given in the following table, the heavy phase being removed before each increase in pressure. The results are given below yields being based on the original stock:

*Fractionation of Urycz topped crude at room temperature*

| Pressure atmospheres | Oil precipitated percent weight | Specific gravity at 15° C. | Viscosity index | Viscosity-gravity constant | Viscosity sec. Say. at 210° F. |
|---|---|---|---|---|---|
| 8 | 8.4 | | | | |
| 30 | 4.9 | 1.019 | | .923 | 5388 |
| 40 | 6.5 | 1.009 | | .920 | 2328 |
| 50 | 7.8 | .981 | | .903 | 498 |
| 60 | 12.6 | .9615 | 23 | .885 | 257 |
| 70 | 13.7 | .9475 | 38 | .873 | 161 |
| 80 | 11.7 | .9365 | 42 | .866 | 141 |
| 90 | 9.4 | .928 | 46 | .860 | 89 |
| 100 | 8.3 | .919 | 49 | .853 | 71 |
| 130 | 11.5 | .9045 | 55 | .843 | 55 |
| * | 4.6 | .886 | | .834 | |

* Residue in the last light phase.

In the above example the fraction precipitated at 8 atmospheres pressure was very dark colored, was asphaltic in character, and was very viscous. It will be noted that the fractions produced are progressively more paraffinic in character, and have lower viscosities.

To illustrate the effect of distilling the fractions obtained by gas fractionation, the following two examples are presented:

EXAMPLE IV

A Grabownica residue crude, free from asphalts and from paraffin wax, was diluted with 3 vols. of a liquid propane-butane fraction, and gas fractionated in the manner described above in Example III at a pressure of 50 atms., and the heavier phase removed. The pressure was increased to 70 atms., and the heavier phase which separated as a result of this increase in temperature had a viscosity index of about 55. Upon distilling this heavy fraction under a pressure of 2 mm., we obtained a distillate amounting to 66% of the heavy fraction, with a viscosity index of 19, and a residue, amounting to 33% of the heavy fraction, with a viscosity index of 76.

EXAMPLE V

The heavy phases separated from a Harklowa crude between pressures of 70 and 100 atms., in the manner described above in Example IV had the properties shown in the first line of the following table. This phase was distilled at atmospheric pressure in the presence of a current of dry natural gas, and five successive fractions and one residue were finally obtained, the residue from each stage being further reduced in the following stage. The results are shown in the table:

| Product | Temperature of still, °C. | Yield percent by weight of initial | Specific gravity at 15° C. | Viscosity index | Viscosity-gravity constant | Viscosity sec. Say. at 210° F. |
|---|---|---|---|---|---|---|
| Initial | | 100 | .927 | +44 | .863 | 78.8 |
| Dist. res | 180-322 | 21.4 | .9255 | 28 | .883 | 42.7 |
| | | 76.8 | .9275 | +48 | .855 | 104 |
| Do | 246-354 | 9.4 | .9271 | +17 | .875 | 51.5 |
| | | 64.4 | .9265 | +50 | .852 | 116 |
| Do | 257-359 | 12.5 | .9298 | +15 | .874 | 64.5 |
| | | 48.9 | .9255 | +62 | .847 | 134 |
| Do | -357 | 8 | .931 | +23 | .865 | 81.6 |
| | | 36.6 | .924 | +70 | .844 | 151 |
| Do | -375 | 10.0 | .9226 | +44 | .859 | 71.2 |
| | | 24.2 | .9225 | +75 | .838 | 169 |

The foregoing example shows that the more a fraction which is obtained by gas fractionation is reduced, the greater is its viscosity index. To produce high viscosity index fractions having lower viscosities at 210° F., a fraction which is precipitated at a higher pressure, or the fraction remaining dissolved in the lighter phase may be distilled. Although we have in the foregoing examples, particularly described the distillation of fractions produced by the gas fractionation method involving the progressive increase of the pressure of the gaseous treating agent, it is pointed out that the distillaton may be applied to fractions obtained by any other method of gas fractionation. The term "gas fractionation", as used in the present specification and claims is, therefore, to be construed broadly to include any method of fractionating a mixture of high molecular substances by the use of a gaseous treating agent which causes the separation of the mixture into two nongaseous phases by lowering the density and the internal pressure of the high molecular mixture.

We claim as our invention:

1. A process for separating a high molecular mixture into portions having different properties, comprising the steps of subjecting said mixture in the normal liquid state to the precipitating action of a quantity of a low molecular treating agent which is incapable of reacting chemically with the high molecular mixture under the conditions of the treatment, under paracritical temperature and pressure conditions for the said treating agent, said quantity being sufficient to cause the formation of at least two nongaseous phases containing different portions of the mixture separating said phases, and distilling at least a portion of one of said separated phases to separate it into at least two distillation products of different volatilities containing substances of said high molecular mixture.

2. The process according to claim 1 in which the high molecular mixture to be separated is first dissolved in a solvent which is liquid under the conditions of the treatment, and the resulting solution is subjected to the precipitating action of the low molecular agent.

3. The process according to claim 1 in which the low molecular treating agent is selected from the group consisting of: methane, ethane, carbon monoxide, water gas, and natural gas.

4. The process according to claim 1 in which the high molecular mixture is an organic non-hydrocarbon mixture.

5. The process according to claim 1 in which the high molecular mixture is a hydrocarbon oil having an initial boiling point above 300° C., said hydrocarbon oil is first dissolved in a preferential solvent for non-paraffinic hydrocarbons, which is a normal liquid at the temperature of the treatment, and the resulting solution of oil and selective solvent is subjected to the precipitating action of the low molecular treating agent.

6. The process according to claim 1 in which the pressure is below the liquefaction pressure of the low molecular treating agent at the temperature of the treatment.

7. The process for separating a high molecular mixture into a plurality of fractions having different properties, comprising the steps of dissolving in said mixture in the normal liquid state a quantity of a low molecular treating agent which is incapable of reacting chemically with the high molecular mixture under the conditions of the treatment, said quantity being sufficient to cause the separation of the mixture into two non-gaseous phases at least one of which is a normal liquid when the treating agent is in a para-critical state, creating in said mixture a condition in which the treating agent is in a para-critical state and said mixture is in a normal liquid state to cause the formation of a primary light normal liquid phase and a primary phase of greater density, separating said primary phases, dissolving an additional quantity of a low molecular treating agent of the type described above in the primary light phase to cause the separation of the primary light liquid phase into secondary non-gaseous phases of different densities, at least one of which is a normal liquid, at a temperature at which the low molecular treating agent added to cause the formation of the secondary phases is in a para-critical state, separating the secondary phases and distilling the denser of said secondary phases to produce at least two distillation products of different volatilities containing substances of said high molecular mixture.

8. The process according to claim 7 in which the pressure is below the liquefaction pressure of the low molecular substance at the temperature of the treatment.

9. The process according to claim 7 in which the temperature at which the high molecular mixture is caused to separate into the primary phases is substantially the same as the temperature at which the primary light phase is caused to separate into the secondary phases.

10. The process according to claim 7 in which the same low molecular treating agent is used to cause the formation of the primary and the secondary phases, and the separation of the mixture into the secondary phases is effected at a higher pressure than that at which the mixture is separated into the primary phases.

11. The process according to claim 7 in which a portion of the distillate produced in the distillation of one quantity of the high-molecular mixture is mixed with a subsequent quantity of the initial high molecular mixture before its separation into primary liquid phases.

12. A process for separating a high molecular mixture of at least two groups of substances, said groups having approximately co-extensive boiling ranges and different internal pressures, into portions of different properties comprising the steps of subjecting said mixture in the normal liquid state to the precipitating action of a quantity of a low molecular treating agent, which is incapable of reacting chemically with the high molecular mixture under the conditions of the treatment, under para-critical temperature and pressure conditions for the said treating agent, said quantity being sufficient to cause the formation of two non-gaseous phases containing portions of the mixture of different compositions, separating the phases, subjecting at least one portion of the mixture in one of the separated phases to fractional distillation under conditions to separate it into a distillate and a bottom product, said distillate containing a higher concentration of substances of the group of higher internal pressure than the original portion.

13. A process for separating a high molecular mixture of at least two groups of substances, said groups having overlapping boiling ranges and different internal pressures into portions of different properties, comprising the steps of fractionally distilling said mixture to produce a fraction containing members of said groups having substantially co-extensive boiling ranges, subjecting said fraction in the normal liquid state to the precipitating action of a quantity of a low molecular treating agent, which is incapable of reacting chemically with the high molecular mixture under the conditions of the treatment, under para-critical temperature and pressure conditions for the said treating agent, said quantity being sufficient to cause the formation of two non-gaseous phases containing different portions of the mixture separating the phases, and subjecting one of said separated phases to distillation under conditions to cause the formation of several fractions having different volatilities.

14. A process for separating a high molecular hydrocarbon oil into fractions of different properties, comprising the steps of subjecting said oil in the normal liquid state to the precipitating action of a quantity of a low molecular gaseous treating agent which is incapable of reacting chemically with the oil under the conditions of the treatment, under para-critical temperature and pressure conditions for the said treating agent, said quantity being sufficient to cause the formation of two non-gaseous phases of different densities, separating the two phases, and distilling at least one of said separated phases to separate it into several fractions of different volatilities containing hydrocarbons of the oil.

15. A process for separating a high molecular hydrocarbon oil into fractions of different properties, comprising the steps of dissolving in said mixture in the liquid state a quantity of a low molecular gaseous treating agent, which is incapable of reacting chemically with the oil under the conditions of the treatment, said quantity being sufficient to cause the formation of two non-gaseous phases when the low molecular agent is in a para-critical state, causing the formation of two primary non-gaseous phases of different densities by subjecting the resulting solution to temperature and pressure conditions at which the said gaseous treating agent is dissolved in the oil in its para-critical state and the oil is in a normal liquid state, separating said primary phases, dissolving an additional quantity of a low molecular treating agent of the type described above in the primary phase of lower density to cause its separation under para-critical temperature and pressure conditions for said agent into secondary non-gaseous phases of different densities, separating the secondary phases, and distilling at least one of the separated secondary phases to separate it into several fractions of different volatilities containing hydrocarbons of said oil.

16. A process for separating a high molecular hydrocarbon oil into fractions of different properties, comprising the steps of subjecting said oil in the normal liquid phase under a superatmospheric pressure to the precipitating action of a low molecular treating agent which is capable of forming two liquid phases, under conditions at which the treating agent is in a para-critical state, to cause the successive formation of a series of liquid phases which have greater specific gravities than the solution of the gaseous treating agent in the oil, successively separately removing each of said liquid phases of greater specific gravities from the solution of the gaseous treating agent in the oil, and distilling at least one of said separated liquid phases of greater specific gravities to separate it into several portions of different volatilities containing hydrocarbons of said oil.

17. A process for producing a lubricating oil having a high viscosity index, comprising the steps of subjecting a lubricating oil fraction in the normal liquid phase at superatmospheric pressure to the precipitating action of a quantity of a low molecular treating agent, under conditions of temperature and pressure at which the low molecular treating agent is in a para-critical state, said quantity being sufficient to cause the formation of two liquid phases having different specific gravities, separating said phases and distilling the phase of greater specific gravity to produce a distillate containing a concentrate of oil components of lower viscosity index and a bottom product containing lubricating oil of higher viscosity index than the oil in the original phase.

STANISLAW PILAT.
MARIAN GODLEWICZ.

Certificate of Correction

Patent No. 2,188,012.　　　　　　　　　　　　　　　　　　　　January 23, 1940.

STANISLAW PILAT ET AL.

It is hereby certified that errors appear in the printed specification of the above numbered patent requiring correction as follows: Page 3, first column, line 23, for "pinoline" read *quinoline*; page 4, second column, line 36, for the word "or" before "stages" read *of*; page 5, second column, line 59, for "has" read *had*; page 6, first column, lines 59 to 71 inclusive, strike out the table and insert instead the following—

| Product | Temperature of still, °C. | Yield per cent by weight of initial | Specific gravity at 15° C. | Viscosity index | Viscosity-gravity constant | Viscosity sec. Say. at 210° F. |
|---|---|---|---|---|---|---|
| Initial | | 100 | .927 | +44 | .863 | 78.8 |
| Dist | 180-322 | 21.4 | .9255 | -28 | .883 | 42.7 |
| Res | | 76.8 | .9275 | +48 | .855 | 104 |
| Dist | 246-354 | 9.4 | .9271 | +17 | .875 | 51.5 |
| Res | | 64.4 | .9265 | +50 | .852 | 115 |
| Dist | 257-359 | 12.5 | .9298 | +15 | .874 | 64.5 |
| Res | | 48.9 | .9255 | +62 | .847 | 134 |
| Dist | -357 | 8 | .931 | +23 | .865 | 81.6 |
| Res | | 36.6 | .974 | +70 | .844 | 151 |
| Dist | -375 | 10.0 | .9726 | +44 | .859 | 71.2 |
| Res | | 24.2 | .9225 | +75 | .838 | 169 | page 6, second column, line 19, after the word and period "mixture." insert the following paragraph—

*In the present specification and claims the term "normal liquid" is used to designate a liquid which is at a temperature lower than para-critical.* ;

and that the said Letters Patent should be read with these corrections therein that the same may conform to the record of the case in the Patent Office.

Signed and sealed this 2nd day of April, A. D. 1940.

[SEAL]

HENRY VAN ARSDALE,
　　　　　　　　　　　　　　　　　　　　　　　　*Acting Commissioner of Patents.*